Nov. 22, 1955   J. R. TAYLOR ET AL   2,724,169
BALE CLEANING APPARATUS
Filed April 21, 1953   2 Sheets-Sheet 2

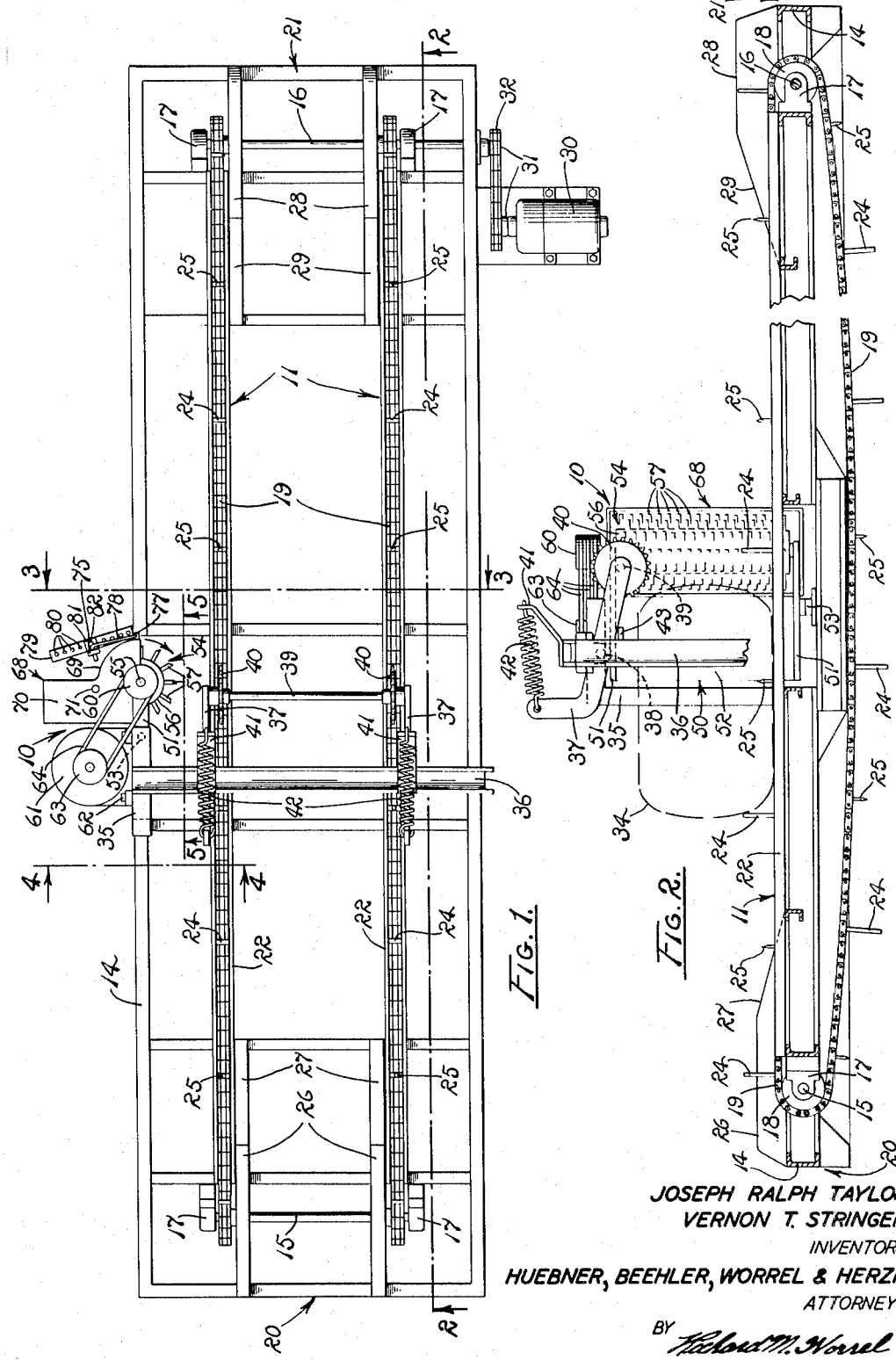

JOSEPH RALPH TAYLOR
VERNON T. STRINGER
INVENTORS

HUEBNER, BEEHLER,
WORREL & HERZIG
ATTORNEYS

United States Patent Office 2,724,169
Patented Nov. 22, 1955

2,724,169

BALE CLEANING APPARATUS

Joseph Ralph Taylor and Vernon T. Stringer, Fresno, Calif.

Application April 21, 1953, Serial No. 350,153

10 Claims. (Cl. 28—1)

The present invention relates to bale cleaning apparatus and more particularly to an apparatus adapted to receive cotton bales which have been damaged by deterioration of cotton along an end or a side thereof and to remove the deteriorated cotton in finely separated fibers for salvage purposes.

In the storage of bales of cotton and the like, particularly during outdoor storage, damage is frequently incurred. Bales of cotton are usually stood on end during storage and thus subject to the absorption of moisture from the ground or other supporting surface. Frequently when heavy rains occur, the lower ends of bales exposed to the weather are actually immersed in water. The resultant damage to the bales substantially reduces the quality thereof and the sale price therefor. Such damage has even resulted in international incidents involving demands for payment for damage to thousands of bales of export cotton.

Heretofore, effort has been made to remove deteriorated cotton from the bales so that the quality of the cleaned bales is not reduced and so that the deteriorated cotton can be salvaged for at least limited use. Such cleaning operations have been of two types. Jets of high velocity compressed air have been directed against the ends or the sides of bales of cotton to blow the fibers therefrom. This practice has been time consuming and expensive. Rotated saw blades have been utilized to saw the deteriorated ends or sides of the bales from the remainder of the bales. The utilization of saw blades for such purpose is also expensive and time consuming. Further, the cotton removed by jets of compressed air and by such saws must be re-shredded preliminary to baling in order to attain a satisfactory salable condition for even salvaged cotton.

An object of the present invention is, therefore, to provide improved means for cleaning cotton bales and the like.

Another object is to provide an apparatus adapted speedily and easily to remove deteriorated cotton and the like from the ends and/or sides of bales.

Another object is to clean cotton bales and the like sufficiently economically to be warranted commercially.

Another object is to provide an apparatus of the character described which not only is thoroughly effective in removing deteriorated cotton in a layer from an end or a side of a bale but which finely separates removed cotton fibers so as to require no further preconditioning for rebaling as salvaged cotton.

Another object is to reduce to a fraction the time required to clean cotton bales as compared with conventional practices.

Another object is to provide a bale cleaning apparatus which is fully automatic in the removal of layers of deteriorated cotton from bales delivered thereto.

Further objects are to provide improved elements and arrangements thereof in a device of the character and for the purposes set forth that is fully effective in performing its intended function, economical to operate and repair, and durable in structure.

Still further objects and advantages will become apparent in the subsequent description in the specification.

Referring to the drawings:

Fig. 1 is a plan view of the bale cleaning apparatus of the present invention.

Fig. 2 is a longitudinal section through the apparatus taken on line 2—2 of Fig. 1.

Figure 3:
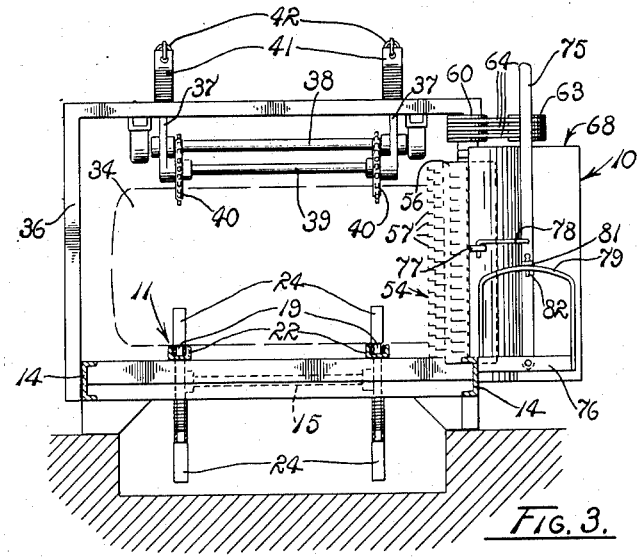
Fig. 3 is a vertical transverse section taken on line 3—3 in Fig. 1.
Figure 4:
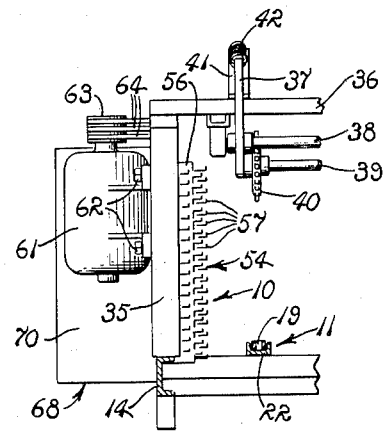
Fig. 4 is a fragmentary vertical transverse section through the apparatus taken on line 4—4 in Fig. 1.

Referring in greater detail to the drawings:

The cleaning apparatus of the present invention includes a tearing mechanism indicated generally by the reference numeral 10 and a conveyor 11 for transferring bales of cotton or the like to and from the tearing mechanism.

The conveyor is provided with an elongated rectangular main frame 14 with an idler shaft 15 and a drive shaft 16 mounted transversely of the frame at opposite ends thereof in bearings 17 attached to the frame. Both of the shafts 15 and 16 mount a pair of spaced sprockets 18 with a chain 19 extended circuitously around corresponding sprockets of each pair. As will subsequently become apparent, the drive shaft 16 is rotated in a direction causing the upper runs of the chains to travel from left to right, as viewed in Figs. 1 and 2, thus the left end 20 is referred to as the receiving end and the right end 21 as the delivery end of the conveyor. The upper run of each chain slides longitudinally in a channel member 22 secured to the frame 14. Mounted in corresponding spaced relation along the chains are a plurality of pusher elements 24 extended from their respective chains so as to be upwardly disposed when traversing the channel members 22. Midway between each pair of adjacent pusher elements on each chain, a spur 25 is mounted on the elements' respective chain and extended therefrom so as to be upwardly disposed when its chain traverses its upper run.

A pair of substantially horizontal, parallel loading rails 26 are mounted on the frame 14 adjacent to each chain at the receiving end 20 of the conveyor and provide upper edges above the chains. An inclined ramp 27 extends downwardly below the upper runs of the chains from the loading rails toward the delivery end 21 of the conveyor. Similarly, delivery rails 28 are mounted on the frame adjacent to each chain at the delivery end of the conveyor. A ramp 29 is inclined from below the upper runs of the chains toward the delivery rails from in the direction of the loading end of the conveyor. The conveyor chains are moved with their upper runs traveled from the receiving end toward the delivery end of the conveyor by an electric motor 30 which is operatively conected to the drive shaft 16 through sprockets 31 attached to both the motor and the drive shaft with an endless chain 32 mounted about the sprockets.

When it is desired to clean a bale of cotton 34, or the like, it is positioned on the receiving rails 26 by means of a lift truck, not shown, or other suitable means. As the chains are traveled, as described, a pair of pusher elements 24 engage the rear of the bale and push it toward the delivery end of the conveyor. As the bale slides down the ramp 27, the spurs on the chain enter the bottom of the bale further assuring unitary travel of the bale with the chains. Thus, the pusher bars and the spurs forcibly move the bale past the tearing mechanism and to the delivery end of the conveyor where the ramps 29 elevate the bale from the spurs 25 and pusher elements 26 onto the delivery rails 28. During engagement of the bale with the tearing mechanism it has been found necessary to hold the bale downwardly against the chains.

For purposes soon to become apparent, an inverted substantially L-shaped post 35 is rigidly mounted on the frame and has a substantially horizontal leg extended longitudinally of the frame toward the delivery end 21. An arch bar 36 has an end rigidly mounted on the frame 14 and an opposite end rigidly mounted on the horizontal leg of the post in spanning relation to the chains 19 forwardly adjacent to the tearing mechanism 10. A pair of substantially L-shaped arms 37 are pivotally mounted on a substantially horizontal rock shaft 38 supported in the arch bar above the chains. Each arm has a portion extended toward the delivery end 21 of the conveyor 11 and an opposite end extended toward the receiving end 20 and thence upwardly, as best shown in Fig. 2. An axle 39 is mounted in substantially horizontal position in the ends of the arms 37 extended toward the delivery end. Toothed wheels 40 are mounted for rotation on the axle in substantially vertical alignment with the chains. A bracket 41 is upwardly extended from the arch bar 36 and toward the delivery end of the conveyor adjacent to each of the upwardly extended ends of the arms 37 and a tension spring 42 interconnects each bracket and the upwardly extended end of its respective arm 37 whereby the arms are urged in counterclockwise pivotal movement about the rock shaft 38 to press the toothed wheels 40 downwardly against cotton bales 34 passed thereunder dependably to retain the bales in position for cleaning by the tearing mechanism 10. Excessive downward pivotal movement of the arms is precluded by engagement thereof with the arch bar. As a bale is carried on the conveyor under the toothed wheels, they ride thereover and at all times urge the bale downwardly. More significantly, the disposition of the axle transversely of the conveyor and mounting of the wheels in fixed axial position on the axle constrains the wheels to planes of rotation aligned with the direction of movement of the bale and engagement of the teeth in the bale precludes lateral shifting of the bale when brought into engagement with the cutter.

The tearing mechanism 10 includes a swing frame 50 fabricated, or otherwise formed, to include a pair of vertically spaced horizontal bars 51 interconnected by a vertical plate 52 welded therebetween. The swing frame is pivotally mounted at 53 on a vertical axis between a portion of the frame 14 and the L support 35 whereby free ends of the bars are movable relatively transversely of the conveyor. A cutter 54 is rotatably mounted on a vertical axle 55 journaled in the free ends of the bars. The cutter comprises a hollow cylinder 56 of plate steel or the like having a multiplicity of teeth 57 rigidly mounted thereon and extended substantially radially therefrom. The teeth are preferably of uniform size and shape, being of square cross section and beveled at their outer ends at 58 to provide sharpened edges 59 at the leading edge of each tooth relative to the direction of drum rotation soon to be described.

Figures 5, 6:
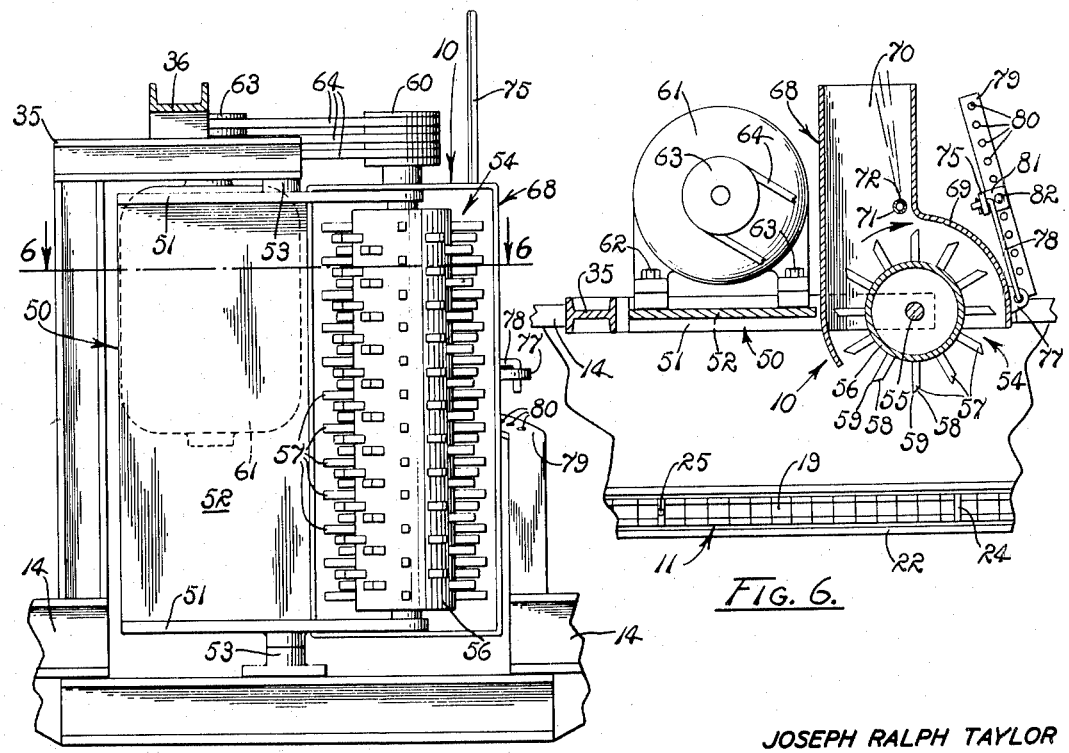
Fig. 5 is an enlarged fragmentary longitudinal section viewing a toothed cylinder and its mounting employed in the cleaning apparatus, taken on line 5—5 in Fig. 1.
Fig. 6 is a fragmentary horizontal section taken on line 6—6 of Fig. 5.

Obviously the present invention is not limited to a precise form, size, nor arrangement of the teeth 57 but it is worthy of observation that teeth three quarters of an inch square in cross section, approximately three or four inches long of high carbon steel are excellently suited to the purpose. As best shown in Fig. 5, the teeth are arranged in rows longitudinally of the cylinder 56 with corresponding teeth in adjacent rows offset from alignment with each other in their paths of rotation. For example, the teeth in the successive rows of teeth in the direction opposite to the direction of cylinder rotation are downwardly offset from circumferential alignment with their respectively corresponding preceding teeth. Although such distance of downward offset may be varied considerably, or upward offsetting utilized if preferred, it is found that when employing teeth of approximately the size described, an offset of approximately ⅜" is appropriate and assures adequate circumferential space between teeth travelling in the same plane. Described differently, the corresponding teeth in the rows are spaced circumferentially of the cylinder and adjacent teeth offset longitudinally of the cylinder from precise circumferential alignment a distance less than the length of the blade-like extended ends of the teeth longitudinally of the cylinder. This achieves desired overlapping in successive engagement with the bale.

The cutter 54 is rotated by mounting a multiple sheave 60 on the axle 55. An electric motor 61, or other suitable prime mover, is attached to the rear face of the vertical plate 52 of the swing frame by bolts 62. A multiple sheave 63 is secured to the drive shaft of the motor concentrically of the pivotal mounting of the swing frame 50 and a plurality of belts extended circuitously about the multiple sheaves 60 and 63. The motor rotates the cutter in a clockwise direction, as viewed in Fig. 1. A motor is provided with sufficient power to rotate the cutter rapidly when in bale engagement. By way of illustration but not limitation, a commercially successful model of the present invention utilizes a fifty (50) horse power motor to rotate the cutter at approximately 2000 revolutions per minute. During rotation of the cutter 54 in engagement with a cotton bale 34, vast quantities of lint are torn from the bale which require prompt removal to avoid clogging. A housing 68 is mounted in the swing frame 50 and provides a susbtantially fracto-cylindrical portion 69 about the cutter. As best shown in Fig. 6, the housing has an opening disposed toward the conveyor 11 adapted to receive a side or an end of a bale carried toward the cutter by the conveyor. A substantially tangential duct 70 is extended from the fracto-cylindrical portion 69 away from the conveyor. A conduit 71 is mounted in a substantially erect position in the duct and provides a plurality of orifices directed longitudinally of the duct away from the cutter. During operation, air under pressure is supplied to the conduit, by means not shown, for discharge through the orifices in order to impel lint outwardly through the duct. Being mounted in the swing frame 50, the housing 68 is movable unitarily with the tearing mechanism.

It will be recalled that the swing frame 50 permits the adjustable positioning of the cutter 54. In view of the forces involved during operation, however, auxiliary means for controlling cutter position are desirable so as to give an operator a mechanical advantage in positioning the cutter. An adjusting lever 75 has a lower end pivotally mounted on a lever support 76 attached to the frame 14. An ear 77 is welded to the housing 68 and a link 78 pivotally interconnects the ear and a portion of the adjusting lever intermediate opposite ends thereof. The lever is held in adjusted positions by providing a rigid arcuate guide 79 mounted on the frame 14 with a plurality of spaced openings 80 formed therethrough. A projection 81 is formed on the adjusting lever adjacent to the guide and a pin 82 passes through the projection 81 and selected openings 80 to hold the lever in a fixed pivotal position. With the pin 82 removed from the projection 81, the adjusting lever may be pivoted to position the cutter for desired depth of engagement of bales passed along the conveyor. Once adjustment is effected, the lever is retained in position by the insertion of the pin through the projection and into one of the openings 80 in the arcuate guide.

*Operation*

The operation and utility of the present invention are believed to be apparent and are briefly summarized at this point. As is well known, cotton bales 34 are substantially rectangular in longitudinal section as well as in transverse section. When stored, the bales are usually rested on their ends, and as previously described, such ends frequently deteriorate during storage. Thus, it is usually desired to remove the ends of the bales to avoid depreciation of the cotton of the entire bale by having deteriorated cotton therewith. It will of course be apparent, however, that sides or edges of the bales may be removed with equal facility.

With the electric motor 30 energized, the conveyor 11 is actuated to travel the upper runs of the chains 19 from the receiving end 20 to the delivery end 21. A bale of cotton 34 is placed on the loading rails 26 in a position longitudinally transversely of the conveyor 11. As the chains continuously travel, a pair of pusher bars 24 engage the rear lower edge of the bale and push it toward the delivery end 21 of the frame 14. The bale, in moving with the conveyor, slides down the ramp 27 onto the chains. As the bale moves down the ramp, a spur 25 on each chain pierces the lower side of the bale to preclude shifting of the bale on the chains.

The bale is carried longitudinally of the frame 14 past the tearing mechanism 10 where a thin layer of cotton is torn from one end of the bale. As the bale approaches a position adjacent to the cleaner, the forward upper corner of the bale engages the toothed wheels 43. The wheels, being held urged downwardly by the springs 44, roll upwardly onto the upper side of the bale as it moves along, forcibly holding the bale down on the spurs and chains to resist lateral movement of the bale on the conveyor 11 incident to engagement with the cutter.

Preliminary to operation, the cutter is adjusted to a predetermined position deemed adequate to remove the deteriorated cotton from the cutter's respectively adjacent end of the bale 34 by removal of the pin 82, manipulation of the lever 75, and return of the pin to position. This adjustment is usually such that a sufficient quantity of cotton is torn from the end of the bale that the end appears white and clean. With the bale dependably supported in fixed position on the chains and moved past the revolving cutter, the sharpened leading edges of the multiplicity of teeth 57 on the cylinder 56 tear off the desired thickness of cotton. Such thickness may also be adjusted during the tearing action by removing the pin and manipulating the lever. The movement of the bale from the receiving end 20 to the delivery end 21 is continuous and at a substantially constant speed. At the delivery end, the bale is pushed upwardly of the ramp 29 onto the unloading rails 28, which are preferably higher than the rails 26, free and clear of the spurs and pusher bars 24 from whence the bale is removed by a fork truck, not shown, or other transporting means.

While the bale is being sheared or torn by the cutter 54, compressed air is directed into the air conduit 71 within the housing 68. The compressed air, being forced from the orifices 72 in the conduit, draws a rapidly moving stream of air through the duct and the cotton lint is therewith removed from the bale 34.

Successive bales 34 are loaded onto the rails 26 and moved by the conveyor 11 past the tearing mechanism 10 in such frequency as desired. When adequate power of the character suggested is employed, the bales are cleaned as rapidly as they can be delivered to the rails 26 and removed from the rails 28.

In the cleaning of bales, it has been found that as much as 4 inches can conveniently be removed from an end of a bale of cotton in 17 seconds. Heretofore, the maximum rate of cleaning of comparable bales was regarded as approximately 30 bales per day. Deteriorated cotton removed from bales by either the conventional compressed air method or by rotary saws must subsequently be shredded in order to condition the cotton for rebaling. The deteriorated cotton salvaged by the device of the present invention is discharged from the duct 70 in perfect condition for rebaling, the fibers being airborne in finely separated and fluffed condition. In addition to the superior cleaning and salvaging characteristics of the present invention, bales of cotton and the like can be cleaned thereby at an expense only a fraction of that required to clean the bales with compressed air or saw blades.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A bale cleaning apparatus comprising a substantially horizontal conveyor having a receiving end and a delivery end, said conveyor being adapted to carry bales thereon from the receiving end to the delivery end while maintaining the bales thereon in the precise attitude received, a cylindrical member mounted for rotation on a substantially vertical axis adjacent to the conveyor intermediate opposite ends thereof, teeth mounted on the periphery of the cylindrical member and extended therefrom for bale engagement, and means mounted in the apparatus vertically spaced from the conveyor adjacent to the cylindrical member for yieldably urging a bale against the conveyor.

2. A bale cleaning apparatus comprising a conveyor defining a plane adapted to receive bales and to convey the same along a predetermined path of movement while retaining the bales in substantially the same attitude as received, a tooth mounting member rotatably mounted on an axis disposed in a plane substantially perpendicularly related to the plane of the conveyor and adjacent to the predetermined path of movement of the bales on the conveyor, teeth rigidly mounted on the mounting member and extended therefrom at substantially equal distances for passage through the path of movement of the bales, the teeth being circumferentially spaced about the mounting member and spaced longitudinally of the mounting member from precise circumferential alignment a distance less than the width of the teeth longitudinally of the mounting member whereby the spaced teeth overlap in successive bale engagement incident to mounting member rotation, bale holding means mounted in the apparatus in spaced relation to the conveyor adjacent to the tooth mounting member for movement toward and from the plane of the conveyor, and resilient means connected to the bale holding means yieldably urging the bale holding means into bale engagement substantially during bale engagement by the teeth of the tooth mounting member.

3. A bale cleaning apparatus comprising a substantially horizontal conveyor adapted to receive bales and to convey the same along a predetermined path of movement while retaining the bales in substantially the same attitude as received, a swing frame mounted for pivotal movement about a substantially vertical axis adjacent to the conveyor having a pair of vertically spaced arms pivotally movable over the conveyor from an edge thereof, a substantially cylindrical member mounted for rotation between the arms about a concentric substantially erect axis, teeth rigidly mounted on the cylindrical member and radially extended therefrom, the teeth being spaced circumferentially about the cylindrical member with adjacent teeth peripherally of the cylindrical member being spaced longitudinally of said member from precise circumferential alignment, the teeth having sharpened extended ends providing elongated vertical edges of lengths greater than the spacing of circumferentially adjacent teeth longitudinally of the member, and driving means mounted on the swing frame having driving connection to the cylindrical member.

4. A cotton bale cleaning apparatus comprising means for carrying cotton bales successively along a predetermined path of movement; a swing frame mounted for pivotal movement about a substantially vertical axis adjacent to the paths of bale movement and extended obliquely in the direction of travel of the bales; an axle mounted in a substantially vertical position between the extended ends of arms; a cylindrical member mounted concentrically on the axle; a multiplicity of rigid teeth radially extended from the cylindrical member, said teeth being spaced circumferentially of the member and circumferentially adjacent teeth being offset longitudinally of the member from precise circumferential alignment, each of the teeth having a beveled end providing a vertically disposed edge of a length greater than the offsetting of adjacent teeth longitudinally of the member; driving means mounted on the swing frame having driving connection to the cylindrical member; and control means connected to the swing frame whereby the teeth mounted on the cylindrical member are movable to and from engagement with bales carried along the predetermined path of movement.

5. In a cotton bale cleaning apparatus, a substantially horizontal frame; a pair of endless chains mounted for circuitous movement in the frame each providing a substantially horizontal upper run longitudinally of the frame, the upper runs of the chains being in substantially parallel relation; a pair of channel members individually receiving and supporting the upper runs of the chains; pusher elements mounted in corresponding positions on the chains; means circuitously moving the chains in the same predetermined direction and at substantially the same speed whereby the upper runs have a receiving end and a delivery end; spurs mounted on the chains intermediate the pusher elements; loading rails mounted in substantially horizontal position on the frame in parallel relation to the chains adjacent and above the receiving end of the upper runs thereof; ramps mounted on the frame between opposite ends of the upper runs of the chains and downwardly extended from the loading rails in the direction of movement of the upper runs of the chains; unloading rails mounted in substantially horizontal position in the frame in parallel relation to the upper runs of the chains at the delivery end thereof; unloading ramps mounted on the frame between opposite ends of the upper runs of the chains and upwardly extended to the unloading rails in the predetermined direction of chain movement; and driven means mounted adjacent to the upper runs of the chains intermediate the ramps engageable with bales carried by the chains to remove portions of the cotton from the bales.

6. A cotton bale cleaning apparatus comprising a substantially horizontal frame; a pair of endless chains mounted for circuitous movement in the frame each providing a substantially horizontal upper run longitudinally of the frame, the upper runs of the chains being in substantially parallel relation; a pair of channel members individually receiving and supporting the upper runs of the chains; pusher elements mounted in corresponding positions on the chains; means circuitously moving the chains in the same predetermined direction and at substantially the same speed whereby the upper runs have a receiving end and a delivery end; spurs mounted on the chains intermediate the pusher elements; loading rails mounted in substantially horizontal position on the frame in parallel relation to the chains adjacent and above the receiving end of the upper runs thereof; ramps mounted on the frame between opposite ends of the upper runs of the chains and downwardly extended from the loading rails in the direction of movement of the upper runs of the chains; unloading rails mounted in substantially horizontal position in the frame in parallel relation to the upper runs of the chains at the delivery end thereof at an elevation above the pusher elements; unloading ramps mounted on the frame between opposite ends of the upper runs of the chains and upwardly extended to the unloading rails in the predetermined direction of chain movement; a swing frame mounted for pivotal movement about a substantially vertical axis adjacent to the chains having a pair of arms horizontally extended therefrom obliquely toward the chains and in the direction of travel of the upper runs thereof; an axle mounted in a substantially vertical position between the extended ends of the arms; a cylindrical member mounted concentrically on the axle; a multiplicity of rigid teeth radially extended from the cylindrical member, said teeth being spaced circumferentially of the member and circumferentially adjacent teeth being offset longitudinally of the member from precise circumferential alignment, each of the teeth having a beveled end providing a substantially vertical edge of a length greater than the offsetting of adjacent teeth longitudinally of the member; driving means mounted on the swing frame having driving connection to the cylindrical member; a housing mounted in the swing frame enclosing a peripheral portion of the cylindrical member and its teeth oppositely disposed from the chains, said housing having a duct extended therefrom away from the chains; means for directing an air stream through the duct away from the chains; control means connected to the housing adapted adjustably to position the swing frame, housing, cylindrical member and teeth borne thereby relative to the upper runs of the chains; an arch bar mounted in the frame in spanning relation to the chains; a rock shaft mounted substantially horizontally in the arch bar transversely of the chains; arms pivotally mounted on the rock bar and extended therefrom in the direction of movement of the upper runs of the chains; a substantially horizontal axle mounted between the extended ends of the arms; a plurality of toothed wheels rotatably mounted on the axle above the chains; and resilient means connected to the arms urging the arms pivotally to lower the toothed wheels against bales of cotton carried thereunder.

7. A cotton bale cleaning apparatus comprising a substantially horizontal frame; a pair of endless chains mounted for circuitous movement in the frame each providing a substantially horizontal upper run longitudinally of the frame, the upper runs of the chains being in substantially parallel relation; a pair of channel members individually receiving and supporting the upper runs of the chains; pusher elements mounted in corresponding positions on the chains; means circuitously moving the chains in the same predetermined direction and at substantially the same speed whereby the upper runs have a receiving end and a delivery end; spurs mounted on the chains intermediate the pusher elements; loading rails mounted in substantially horizontal position on the frame in parallel relation to the chains adjacent and above the receiving end of the upper runs thereof; ramps mounted on the frame between opposite ends of the upper runs of the chains and downwardly extended from the loading rails in the direction of movement of the upper runs of the chains; unloading rails mounted in substantially horizontal position in the frame in parallel relation to the upper runs of the chains at the delivery end thereof at an elevation above the pusher elements; unloading ramps mounted on the frame between opposite ends of the upper runs of the chains and upwardly extended to the unloading rails in the predetermined direction of chain movement; a swing frame mounted for pivotal movement about a substantially vertical axis adjacent to the chains having a pair of arms horizontally extended therefrom obliquely toward the chains and in the direction of travel of the upper runs thereof; an axle mounted in a substantially vertical position between the extended ends of the arms; a cylindrical member mounted concentrically on the axle; a multiplicity of rigid teeth radially extended from the cylindrical member, said teeth being spaced circumferentially of the member and circumferentially adjacent teeth being offset longitudinally of the member from precise circumferential alignment, each of the teeth having a beveled end providing a vertically disposed edge of a length greater than the offsetting of adjacent teeth longitudinally of the member; driving means mounted on the swing frame having driving connection to the cylindrical member; a housing mounted in the swing frame enclosing a peripheral portion of the cylindrical member and its teeth oppositely disposed from the chains, said housing having a duct extended therefrom away from the chains; means for directing an air stream through the duct away from the chains; a lever pivotally mounted on the frame adjacent to the housing; a link interconnecting the lever and the housing whereby the housing and the cylindrical member are horizontally positionable relative to the chains; means for retaining the lever in adjusted pivotal position in the frame; an arch bar mounted in the frame in spanning relation to the chains; a rock shaft mounted substantially horizontally in the arch bar transversely of the chains; arms pivotally mounted on the rock bar and extended therefrom in the direction of movement of the upper runs of the chains; a substantially horizontal axle mounted between the extended ends of the arms; a plurality of toothed wheels rotatably mounted on the axle above the chains; and resilient means connected to the arms urging the arms pivotally to lower the toothed wheels toward the chains.

8. A bale cleaning apparatus comprising a substantially horizontal conveyor having a receiving end and a delivery end, said conveyor being adapted to carry bales thereon from the receiving end to the delivery end while maintaining the bales thereon in substantially the precise attitude received, a cylindrical member mounted for rotation on a substantially vertical axis adjacent to the conveyor intermediate opposite ends thereof, teeth mounted on the periphery of the cylindrical member and extended therefrom for engagement with the bale being carried by the conveyor, means for adjustably positioning the cylindrical member transversely of the conveyor, and means mounted in the apparatus vertically spaced from the conveyor adjacent to the cylindrical member for yieldably urging a bale against the conveyor.

9. A bale cleaning apparatus comprising a substantially horizontal conveyor having a receiving end and a delivery end, said conveyor being adapted to carry bales thereon from the receiving end to the delivery end while maintaining the bales thereon substantially constantly in the attitude received, a cylindrical member mounted for rotation on a substantially vertical axis adjacent to the conveyor intermediate opposite ends thereof, teeth mounted on the periphery of the cylindrical member and extended therefrom for engagement with the bale being carried by the conveyor, and bale holding means mounted in the apparatus including a rock shaft mounted in vertically spaced relation to the conveyor adjacent to the cylindrical member, a toothed-wheel freely rotatably mounted at one end of the rock shaft adapted for engagement with a bale, and a spring connected to the other end of the rock shaft for yieldably urging the toothed-wheel against a bale during engagement thereof with the teeth of the cylindrical member.

10. A bale cleaning apparatus comprising a substantially horizontal conveyor having a receiving end and a delivery end, said conveyor being adapted to carry bales thereon from the receiving end to the delivery end while maintaining the bales thereon in substantially the same attitude as received, a cylindrical member mounted for rotation on a substantially vertical axis adjacent to the conveyor intermediate opposite ends thereof, teeth mounted on the periphery of the cylindrical member and extended therefrom for bale engagement, an air duct having a portion partially enclosing the cylindrical member and teeth thereof, means for directing a stream of air through the duct in a direction away from the cylindrical member for impelling outwardly of the duct bale particles removed from a bale by the teeth of the cylindrical member, and means mounted in the apparatus for urging a bale against the conveyor during engagement of the bale by the teeth of the cylindrical member.

References Cited in the file of this patent

UNITED STATES PATENTS

| | | |
|---|---|---|
| 551,677 | Jaeger | Dec. 17, 1895 |
| 1,944,271 | Riedling | Jan. 23, 1934 |
| 2,505,690 | Senior et al. | Apr. 25, 1950 |
| 2,636,220 | Lyall | Apr. 28, 1953 |